Figure 1:
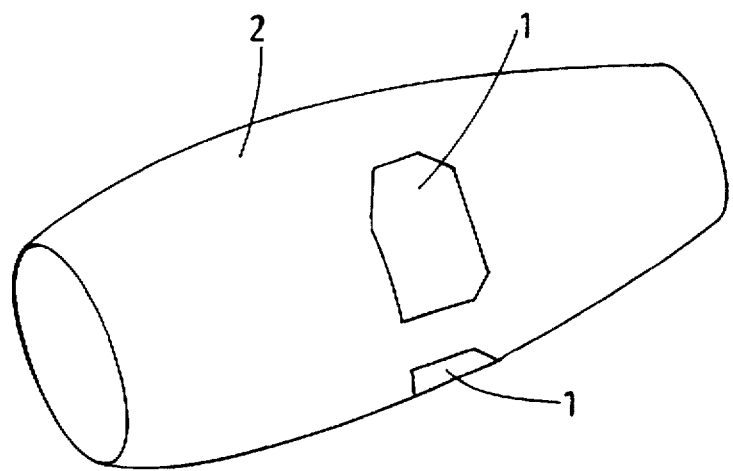

United States Patent

Harvey

[11] Patent Number: 5,735,557
[45] Date of Patent: Apr. 7, 1998

[54] LOCK MECHANISM

[75] Inventor: John Herbert Harvey, Wolverhampton, England

[73] Assignee: Lucas Industries, plc, England

[21] Appl. No.: 529,368

[22] Filed: Sep. 18, 1995

[30] Foreign Application Priority Data

Sep. 20, 1994 [GB] United Kingdom ............. 9418895

[51] Int. Cl.$^6$ ............................................. E05C 3/16
[52] U.S. Cl. .................... 292/216; 292/207; 60/226.2; 239/265.29; 244/110 B
[58] Field of Search ............... 292/198, 106, 292/341.16, 207, 150, 216; 60/226.2, 232; 239/265.31, 265.29; 244/110 B

[56] References Cited

U.S. PATENT DOCUMENTS

| 1,872,092 | 8/1932 | Neverman | 292/207 X |
|---|---|---|---|
| 2,285,330 | 6/1942 | Dowden et al. | 292/144 X |
| 3,004,772 | 10/1961 | Bohlen et al. | 292/150 X |
| 3,247,924 | 4/1966 | Price | 292/341.16 X |
| 3,295,878 | 1/1967 | Houvener | 292/144 |
| 3,614,147 | 10/1971 | Spector | 292/341.16 X |
| 3,638,983 | 2/1972 | Flournoy et al. | 292/144 X |
| 3,926,460 | 12/1975 | Peterson | 292/144 |
| 3,950,018 | 4/1976 | Pickering | 292/144 |
| 4,169,616 | 10/1979 | Peterson | 292/144 |
| 4,383,647 | 5/1983 | Woodruff et al. | 244/110 B X |
| 4,508,296 | 4/1985 | Clark | 292/207 X |
| 4,691,948 | 9/1987 | Austin, Jr. et al. | 292/207 X |
| 4,726,203 | 2/1988 | Komuro | 292/144 X |
| 4,913,475 | 4/1990 | Bushnell et al. | 292/144 |
| 5,404,714 | 4/1995 | Davies | 60/226.2 |
| 5,547,130 | 8/1996 | Davies | 60/226.2 X |

FOREIGN PATENT DOCUMENTS

| 0542611 | 5/1993 | European Pat. Off. . |
|---|---|---|
| 0580352 | 1/1994 | European Pat. Off. . |
| 0646718 | 4/1995 | European Pat. Off. . |
| 75156 | 4/1961 | France ................... 292/207 |

Primary Examiner—Rodney M. Lindsey
Attorney, Agent, or Firm—Andrus, Sceales, Starke & Sawall

[57] ABSTRACT

A lock for a thrust reversal system of a gas turbine engine includes a pivotal locking member which is moved into the locking position by the engagement of a part of the thrust reversal system as the latter is moved to the inoperative position. The locking member is held in the locking position by a pin which engages within an opening formed in the locking member. The pin is biased by a spring and is movable by a hydraulic piston against the action of the spring to withdraw the pin from the opening.

8 Claims, 2 Drawing Sheets

LOCK MECHANISM

This invention relates to a lock for use in a thrust reversal system of a gas turbine engine.

A gas turbine thrust reversal system acts to redirect a substantial part of the thrust produced by the engine to provide a force acting to decelerate the associated aircraft. One form of such a system for use with a fan type gas turbine engine comprises a plurality of doors located about the axis of the engine and which can be deployed to direct gas flow forwardly of the engine and to limit or prevent gas flow rearwardly of the engine. The doors are operated by respective hydraulic actuators. In order to prevent inadvertent deployment of a door due to a malfunction of the actuator or the associated hydraulic system, it is usual to provide a so called primary lock which includes a movable locking member which can be locked in a locking position to prevent deployment of the associated door until the locking mechanism is released. The locking mechanism may also be hydraulically actuated.

As an additional safety measure a separate locking mechanism may be provided for the locking member. EP-A-0580352 shows one form of the so called separate locking mechanism in which a pin is spring biased to its locking position arid is retracted from the locking position by means of a solenoid associated with which is an armature coupled to the pin. The pin in its locking position engages with a face defined on the locking member. The armature travel must be sufficient to retract the pin out of interference with the face, against the force exerted by the spring which loads the pin and this requires a solenoid of substantial power.

Moreover, the pin and locking member are located in an environment where ice can form and if the spring force is increased to ensure movement of the pin to its locking position, the solenoid power has to be increased accordingly. This raises a number of problems not least of which is the physical size of the solenoid and the power supply thereto.

The object of the invention is to provide a lock for the purpose specified in an improved form.

According to the invention a lock for use in a gas turbine thrust reversal system includes a first locking member having a locking position, a second locking member movable into an opening formed in the first locking member to secure the first locking member in the locking position, a piston slidable within a cylinder and coupled to the second locking member, resilient means biasing the second locking member to engage within the opening and means for controlling the fluid pressure applied to said piston whereby in one setting a force can be developed on the piston to supplement the force exerted by the resilient means and in another setting a force can be developed on the piston to withdraw the second locking member from the opening.

Preferably the first locking member is a pivotally mounted fork movable to and from the locking position at which it engages with a thrust reverser. Advantageously the second locking member is a bolt.

Figure 2:
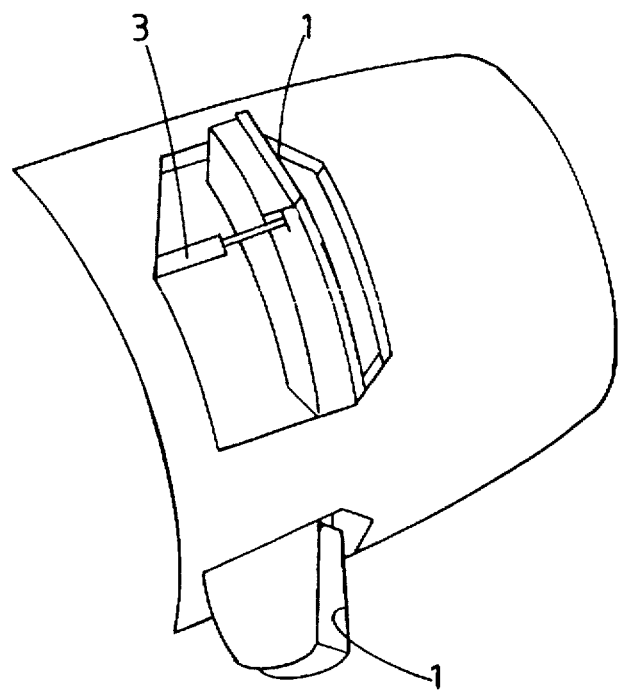
Figure 3:
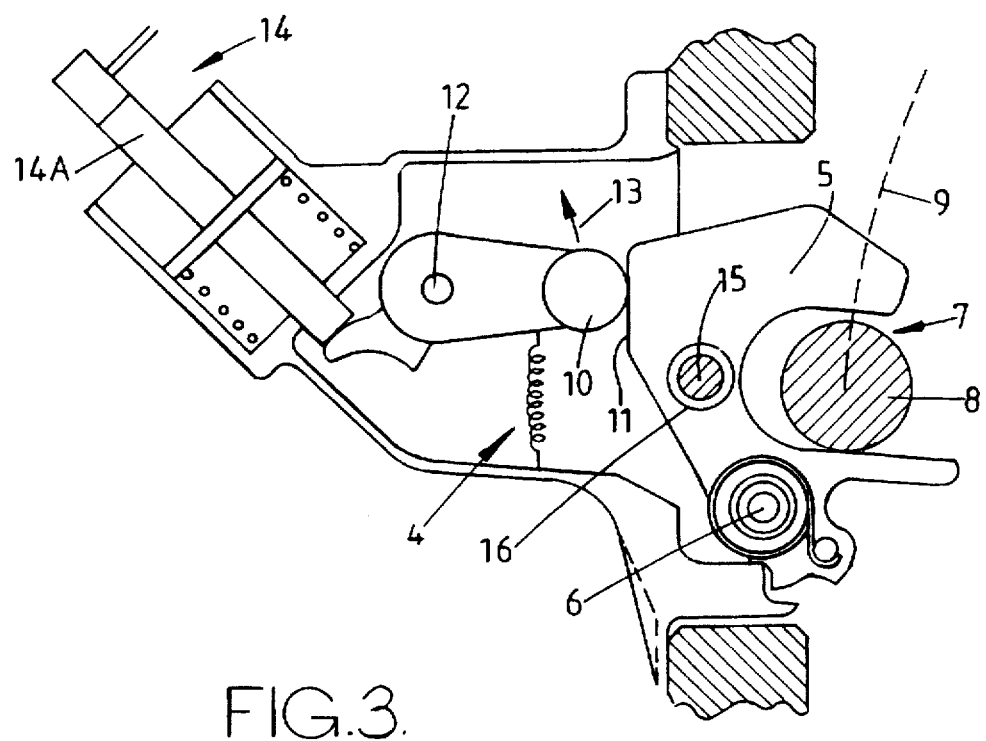
Figure 4:
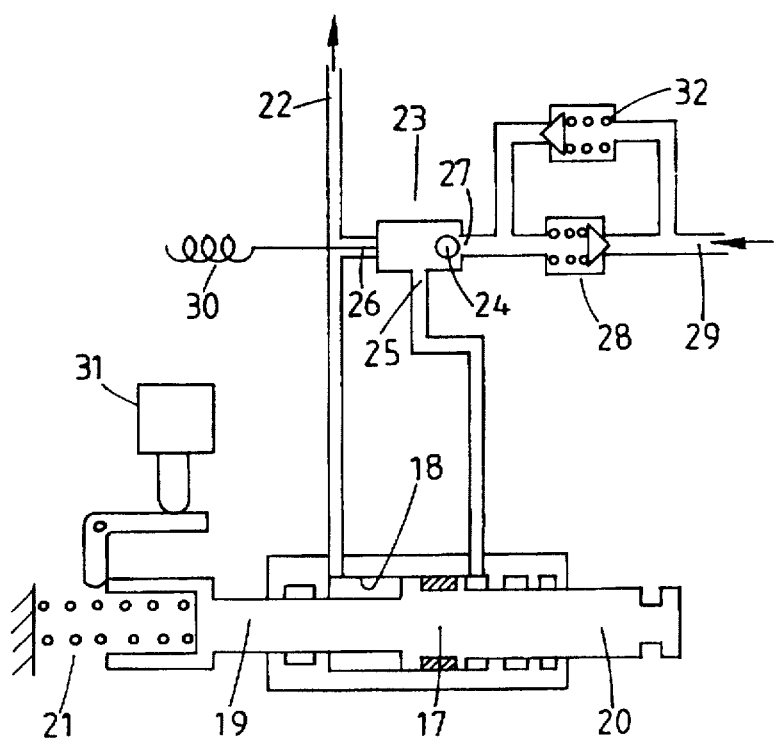

An example of a lock in accordance with the invention will now be described with reference to the accompanying drawings in which:

FIG. 1 is a diagrammatic perspective view of the exterior of a gas turbine engine, FIG. 2 shows to an enlarged scale, the deployment of the gas deflecting components of the thrust reversal system, FIG. 3 shows in side elevation, a known primary lock for the thrust reversal mechanism, and FIG. 4 shows a hydraulic circuit for use with part of the lock seen in FIG. 3.

Referring to the drawings, there is illustrated in FIG. 1 the gas deflecting components in the form of doors 1 which are arranged around the periphery of a fan type gas turbine engine 2. As shown in FIG. 2, the doors may be deployed to an open position by respective hydraulic actuators 3 and in the deployed position a substantial portion of the gas which flows through the engine is directed forwardly of the engine to provide reverse thrust to assist deceleration of the aircraft when landing.

It is essential to ensure that the doors are not deployed accidentally when the aircraft is in flight and to this end a so called primary lock which is generally indicated at 4 in FIG. 3, is provided, the actuators 3 each incorporating a so called secondary lock. The primary lock comprises a locking member 5 which is pivotally mounted at 6 and which in one face is formed with a generally "C" shaped slot 7. The locking member 5 is spring biased in the anti clockwise direction about the pivot. The entrance to the slot is positioned to receive a peg 8 which is part of the structure of the associated door 1. In the position shown in FIG. 3 the peg is held within the slot 7 and the locking member is in its locked position. When the locking member is free to move as will be described, actuation of the associated actuator 3 will move the peg in the direction indicated by the dotted line 9. This will cause angular movement of the locking member in the anticlockwise direction to the unlocked position. When the hydraulic actuator is actuated to close the door the peg 8 reenters the slot 7 and the locking member is pivoted in the clockwise direction to the position shown.

The locking member is retained in the locked position by the engagement of a roller 10 with a surface 11 defined on the locking member. The roller is mounted upon an arm which is pivotally mounted about an axis 12 and is movable in the direction of the arrow 13 against the action of a spring by means of an hydraulic actuator 14 which includes a piston 14A. When the actuator is supplied with hydraulic fluid the roller moves along the path 13 to disengage from the surface 11 thereby allowing the main actuator 3 to deploy the associated door.

A so called tertiary lock is provided and this comprises a bolt 15 which is movable in a plane normal to the locking member to engage within a cylindrical opening 16 formed in the locking member. The bolt is movable into and out of the opening 16 by means of a fluid pressure operable piston which is seen in FIG. 4 together with the associated control system.

Referring to FIG. 4 the piston 17 is slidable within a cylinder 18 and extending through the ends of the cylinder are piston rods 19 and 20 respectively. The piston rod 20 has a larger diameter than the piston rod 19 and is coupled by means not shown to the bolt 15. The piston rod 19 defines a recess for a spring 21 which biases the piston 17 together with the bolt 15 into the opening 16. The space defined between the cylinder 18 and the piston rod 19 communicates with a low pressure drain by way of a passage 22. A two position solenoid valve 23 is provided and has a common port 25 which is connected to the annular space defined between the wall of the cylinder and the piston rod 20. In addition the valve has a port 26 which is connected to the passage 22 and a port 27 which is connected by way of a non-return valve 28, to a passage 29 which can be connected to a pressure source higher than that to which the passage 22 is connected. The valve includes a valve member 24 which can move to close either the port 26 or the port 27, the port 26 being closed when the solenoid 30 of the valve is energised.

A further non-return valve 32 is connected in parallel with the valve 28. The valve 32 allows fluid flow in the direction opposite to that of the valve 28 and a higher pressure is required to open the valve 28 than that generated by the combined action of the spring 21 and the low pressure fluid in line 22 acting against the piston.

When it is required to deploy the doors the passage 29 is connected to the source of fluid under pressure and the solenoid 30 is energised to disconnect the port 25 from the port 26 and connect it to the port 27. The fluid under pressure can now flow past the non-return valve 28 and into the cylinder to act on the right hand end surface of the piston. This pressure produces a force acting on the piston which is greater than the force exerted on the piston by the spring 21 and the force acting on the piston due to the pressure in the passage 22. As a result the piston moves towards the left and the bolt is withdrawn from the aperture 16. When the roller 10 is moved clear of the face 11, the actuator 3 can move to deploy the door. When reverse thrust is no longer required the actuator 3 moves the door to the closed position so that the locking member 5 is moved to the position shown in FIG. 3. The roller 10 can then be reengaged with the surface 11 and the solenoid 30 de-energised to permit the valve member 24 to close the port 27. Both sides of the piston are now connected to the passage 22 and the pressure of the drain to which the passage 22 is connected can now act on the piston to move it towards the right assisted by the action of the spring 21. The bolt therefore is reinserted in the opening 16.

The use of a hydraulically operated piston to actuate the bolt has a number of advantages over for example solenoid operation of the bolt in that the stroke of the piston is not limited and may be as long as is required. In addition, ample force is available to drive the bolt into the opening should for example the opening be blocked or even partially blocked by ice. Moreover, there is a significant weight reduction over a solenoid of the size which would be required to actuate the bolt and the solenoid 30 which controls the valve can be powered from a low voltage source independent of any of the solenoid valves which are found in the thrust reversal system.

In addition, when the bolt is in the opening, failure of the hydraulic pressure will have little consequence because of the presence of the spring 21 which will maintain the bolt within the opening. Moreover, because of the differential areas of the piston 17, if the passage 22 should become blocked and leakage occur within the valve 23 the hydraulic forces acting on the piston will simply urge the piston towards the right so that the bolt will be maintained within the opening and deployment of the doors will not be able to take place.

In order to sense the operation of the piston a micro switch 31 is provided.

In the event of a solenoid failure such that the port 26 remains closed with ports 25 and 27 interconnected, the action of the valve 28 creates a hydraulic lock on the piston 17 which prevents the piston rod 20 from moving to the right as shown in FIG. 4. If the solenoid is de-energised but the valve member 24 does not move, the combination of the signal to de-energise the solenoid and the position signal from the microswitch 31 can be used to generate a fault signal.

The valve 32 operates as a pressure relief valve, to release high pressure which may be generated by a temperature rise in the trapped volume between the port 27 and the valves 28 and 32 when the valve member 24 is in a position to close the port 27.

In a further embodiment of the present invention, the so called tertiary lock may be arranged at a position remote from the primary lock 4. Thus a further locking member similar to locking member 5 of FIG. 3 is pivotally mounted at a position remote from the primary lock, and the bolt 15 is arranged to engage in an opening in the further locking member. The further locking member is arranged to engage a further peg forming part of the structure of the associated door, and is biased to the unlocked position by a spring. Closure of the door causes the further peg to engage the further locking member and to move the further locking member to the locked position. Operation of the bolt, solenoid and piston arrangement is as described hereinabove.

What is claimed is:

1. A lock for use in a thrust reversal system of a gas turbine engine, the thrust reversal system including a member movable between a stowed position and a deployed position under the control of a thrust reversal system controller, the lock comprising a first locking device having a first operator and including a first locking member movable between an open position and a locked position in which the first locking member cooperates with the thrust reversal system to retain the movable member of the thrust reversal system in its stowed position, a second locking device having a second operator operable independently of said first operator and including a second locking member movable into engagement with said first locking member to secure said first locking member in said locked position wherein said second locking member is movable into an opening formed in said first locking mender, said second operator including a piston slidable within a cylinder, said piston adapted to be coupled to said second locking member, resilient means biasing said second locking member to engage within said opening and control means for controlling a fluid pressure applied to said piston such that in one setting of the control means, the fluid pressure applied to said piston exerts a force on said piston to supplement the force exerted on said piston by said resilient means and in another setting of said control means, the fluid pressure applied to said piston exerts a force on said piston to withdraw said second locking member from said opening.

2. A lock according to claim 1, in which said first locking member is a pivotally mounted fork defining a slot positioned to receive a part of said thrust reversal system as the latter moves from an operative to an inoperative position and to be moved by said part to said locking position.

3. A lock according to claim 1, in which said piston is coupled to first and second piston rods extending through opposite ends of said cylinder, said first piston rod being coupled to said resilient means and said second piston rod adapted to be coupled to said second locking member, said control means acting to control the fluid pressure applied to a first side of said piston adjacent said second piston rod, and said control means comprising a two position valve in the first position of which fluid under pressure is directed to act on said first side of said piston to move said piston against the action of said resilient means and in the second position of which said first side of said piston is exposed to a low pressure to allow said piston to move under the action of said resilient means.

4. A lock according to claim 3, in which a second opposite side of said piston is exposed to said low pressure.

5. A lock according to claim 4, in which said first piston rod has a smaller diameter than said second piston rod, whereby said first side of said piston has a physical area which is smaller than that of said second opposite side.

6. A lock according to claim 3, in which said two position valve is a solenoid operated valve.

7. A lock according to claim 3, in which a sensor is provided for providing an electrical signal indicative of the position of said piston and said second locking member.

8. A lock according to claim 2, in which a roller movable into engagement with a surface defined on said first locking member is provided to provide a further means for retaining said first locking member in said locking position.

* * * * *

UNITED STATES PATENT AND TRADEMARK OFFICE
CERTIFICATE OF CORRECTION

PATENT NO. : 5,735,557
DATED : April 7, 1998
INVENTOR(S) :
JOHN HERBERT HARVEY

It is certified that error appears in the above-indentified patent and that said Letters Patent is hereby corrected as shown below:

Claim 1, column 4, line 29, delete "mender" and insert --member--.

Signed and Sealed this

Thirtieth Day of June, 1998

Attest:

BRUCE LEHMAN

*Attesting Officer*　　　　*Commissioner of Patents and Trademarks*